United States Patent [19]
Adachi

[11] Patent Number: 6,084,884
[45] Date of Patent: Jul. 4, 2000

[54] CDMA COMMUNICATION METHOD AND GROUP SPREADING MODULATOR

[75] Inventor: Fumiyuki Adachi, Yokohama, Japan

[73] Assignee: NTT Mobile Communications Network, Inc., Tokyo, Japan

[21] Appl. No.: 08/878,397

[22] Filed: Jun. 18, 1997

[30] Foreign Application Priority Data

Jun. 19, 1996 [JP] Japan .................................. 8-158503
Feb. 13, 1997 [JP] Japan .................................. 9-029445
Mar. 27, 1997 [JP] Japan .................................. 9-075751

[51] Int. Cl.$^7$ .................................................. H04B 7/216
[52] U.S. Cl. .......................... 370/441; 370/203; 370/209; 370/342; 375/200
[58] Field of Search .................................... 370/203, 204, 370/208, 209, 441, 335, 342, 328, 329; 375/200, 208

[56] References Cited

U.S. PATENT DOCUMENTS

| | | | |
|---|---|---|---|
| 5,309,474 | 5/1994 | Gilhousen et al. | 370/209 |
| 5,416,797 | 5/1995 | Gilhousen et al. | 375/209 |
| 5,715,236 | 2/1998 | Gilhousen et al. | 370/209 |
| 5,764,687 | 6/1998 | Easton | 375/206 |

FOREIGN PATENT DOCUMENTS

0637185A2  2/1995  European Pat. Off. .
WO 95/03652  2/1995  WIPO .

OTHER PUBLICATIONS

European Search Report for European Patent Application No. 97304088.4-2209/ dated Jul. 9, 1999.
European Search Report under Publication No. 0637185A3 dated Feb. 7, 1996.
International Search Report for PCT Application No. PCT/US 94/08179.
Liu et al., "A Demand–Assignment Access Control for Multi–Code DS–CDMA Wireless Packet (ATM) Networks", IEEE Publication, Mar. 24, 1996, pp. 713–729.
McTiffin et al., "Mobile Access to an ATM Network Using a CDMA Air Interface", IEEE Journal on Selected Areas in Communications, Jun. 5, 1994, pp. 900–908.

Primary Examiner—Ajit Patel
Assistant Examiner—Bob A. Phunkulh
Attorney, Agent, or Firm—Brown Raysman Millstein Felder & Steiner LLP

[57] ABSTRACT

A CDMA communication method capable of providing a multi-rate user with high quality transmission using a spreading sequence selected from sequences which consist of multilayer sequences arranged in a hierarchical tree structure. A higher level sequence $C_{16}(1)$ and its inverted sequence $\tilde{C}_{16}(1)$ are included in its lower level sequences $\{C_{32}(1), C_{32}(2)\}$ and $\{C_{64}(1), C_{64}(2), C_{64}(3), C_{64}(4)\}$, for example, and a sequence from a higher level is selected to transmit a higher rate data: The $C_{16}(1)$ is used to transmit data whose peak rate is twice the peak rate of the data transmitted using its lower level sequences $\{C_{32}(1), C_{32}(2)\}$, and four times $(=2^2)$ that of the data transmitted using the sequences $\{C_{64}(1), C_{64}(2), C_{64}(3), C_{64}(4)\}$. The $C_{16}(l)$, however, cannot be selected if any one of its lower level sequences $\{C_{32}(1), C_{32}(2)\}$ and $\{C_{64}(1), C_{64}(2), C_{64}(3), C_{64}(4)\}$ are already being used. This makes it possible for all the spreading sequences of simultaneous multi-rate users to be orthogonal at any transmission rate.

30 Claims, 13 Drawing Sheets

$$C_2 = \begin{pmatrix} C_2(1) \\ C_2(2) \end{pmatrix} = \begin{pmatrix} 1 & 1 \\ 1 & 0 \end{pmatrix}$$

$$C_4 = \begin{pmatrix} C_4(1) \\ C_4(2) \\ C_4(3) \\ C_4(4) \end{pmatrix} = \begin{pmatrix} C_2(1) & C_2(1) \\ C_2(1) & \overline{C_2(1)} \\ \hdashline C_2(2) & C_2(2) \\ C_2(2) & \overline{C_2(2)} \end{pmatrix}$$

$$C_{2n} = \begin{pmatrix} C_{2n}(1) \\ \vdots \\ C_{2n}(2n) \end{pmatrix} = \begin{pmatrix} C_n(1) & C_n(1) \\ C_n(1) & \overline{C_n(1)} \\ \hdashline \vdots & \vdots \\ \hdashline C_n(n) & C_n(n) \\ C_n(n) & \overline{C_n(n)} \end{pmatrix}$$

$\overline{C_a(b)}$ REPRESENTS INVERSION OF $C_a(b)$, THAT IS, "1" AND "0" IN $C_a(b)$ ARE INVERTED TO "0" AND "1" IN $\overline{C_a(b)}$

FIG.2

Cn(1)-Cn(n) CORRESPOND TO n ROW VECTORS CONSTITUTING MATRIX Cn.

$$D_{2R} = \begin{pmatrix} d_{2R}(1) \\ d_{2R}(2) \\ \vdots \\ d_{2R}(2^R) \end{pmatrix} = \begin{pmatrix} \begin{matrix} d_{2R-1}(1) & d_{2R-1}(1) \\ d_{2R-1}(1) & \overline{d_{2R-1}}(1) \end{matrix} \\ \vdots \\ \begin{matrix} d_{2R-1}(2^{R-1}) & d_{2R-1}(2^{R-1}) \\ d_{2R-1}(2^{R-1}) & \overline{d_{2R-1}}(2^{R-1}) \end{matrix} \end{pmatrix}$$

$D_1 = 1$ $\overline{da}(b)$ REPRESENTS INVERSION OF da(b), THAT IS, "1" AND "0" IN da (b) ARE INVERTED TO "0" AND "1", RESPECTIVELY IN $\overline{da}(b)$

*FIG.12*

CDMA COMMUNICATION METHOD AND GROUP SPREADING MODULATOR

BACKGROUND OF THE INVENTION

FIELD OF THE INVENTION

The present invention relates to a CDMA (Code Division Multiple Access) communication method and a group spreading modulator applicable to the method. The contents of Application Ser. No. 158,503/1996, filed Jun. 19, 1996, Ser. No. 029,445/1997, filed Feb. 13, 1997 and Ser. No. 075,751/1997, filed Mar. 27, 1997, in Japan are hereby incorporated by reference.

DESCRIPTION OF RELATED ART

Conventionally, spreading sequences of the same length have been used in the CDMA communication system. Those spreading sequences are orthogonal to each other when multiple users communicate simultaneously through forward links (from a base station to mobile stations). This is because all the simultaneous users share the same radio band in the CDMA, and hence the interference between the users must be minimized.

Applying this method, however, causes a problem in that transmission rates become equal for the entire simultaneous users. For example, when using spreading sequences with a period of 1024 chips at a bandwidth of about 1 MHz, the transmission rate will be 9.6 kbps at the peak. The peak transmission rate, however, generally varies according to transmission types: For example, although voice communications requires only about 8 kbps, picture transmission necessitates at least 64 kbps, and modem data transmission needs 28.8 kbps. In such an environment, a plurality of simultaneous users have conventionally communicated using spreading sequences with different periods which are not orthogonal to each other. This presents a problem in that interference between the simultaneous users increases when communicating through the same radio band at different transmission rate, resulting in the degradation in the transmission quality.

SUMMARY OF THE INVENTION

It is therefore an object of the present invention to provide a CDMA communication method capable of achieving generation and selection of spreading sequences for implementing multi-rate CDMA communications without interference.

Another object of the present invention is to provide a group spreading modulator suitable for the spreading modulation using the spreading sequences thus generated.

The first aspect of the invention is a CDMA communication method which obtains a narrowband modulated signal by modulating transmitted data, performs spreading modulation of the narrowband modulated signal into a wideband signal using a spreading sequence, and transmits the wideband signal, the CDMA communication method comprising the steps of:

successively generating a $2^N \times 2^N$ matrix, where N is an integer greater than zero, from a smaller dimensional matrix under a predetermined rule, row vectors of the $2^N \times 2^N$ matrix being orthogonal to each other; and selecting one of the row vectors of one of the matrices as the spreading sequence in accordance with a peak rate of a transmission rate of the transmitted data.

The second aspect of the invention is a CDMA communication method which obtains narrowband modulated signals by modulating transmitted data, performs spreading modulation of the narrowband modulated signals into a wideband signal using spreading sequences, and transmits the wideband signal, the CDMA communication method comprising the steps of:

successively generating $2^{N-R} \times 2^{N-R}$ matrix, where N and, R are an integer greater than zero, and R is smaller than N, from a smaller dimensional matrix under a predetermined rule, row vectors of the $2^{N-R} \times 2^{N-R}$ matrix being orthogonal to each other;

selecting one of the row vectors of one of the matrix as a common first spreading sequence, or selecting as the common first spreading sequence one of a set of orthogonal sequences generated using another generating method;

successively generating a $2^R \times 2^R$ matrix from a smaller dimensional matrix under a predetermined rule, row vectors of the $2^R \times 2^R$ matrix being orthogonal to each other;

selecting each row vector in the $2^R \times 2^R$ matrix as a second spreading sequence whose rate is $\frac{1}{2}^{N-R}$ of that of the common first spreading sequence; and carrying out spreading modulation by multiplying narrowband modulated signals by the common first spreading sequence and each second spreading sequence.

The third aspect of the invention is a group spreading modulator for spreading a plurality of narrowband signals into a wideband signal, the group spreading modulator comprising:

multiple basic modulator elements arranged in an N-layer hierarchical structure, where N is an integer greater than one, each of the multiple basic modulator elements having three inputs and a single output, two inputs of the three inputs being supplied with modulation signals, and a remaining input being supplied with a periodic signal for spreading which is multiplied by one of the two modulation signals, wherein the number of the multiple basic modulator elements being halved as the layer rises by one step in the N-layer hierarchical structure such that $2^{(N-1)}$ basic modulator elements are placed at a primary layer, $2^{(N-2)}$ basic modulator elements are placed at a secondary layer, $2^{(N-3)}$ basic modulator elements are places at a third layer, and wherein outputs of the multiple basic modulator elements at a layer are input to the multiple basic modulator elements at an immediately upper layer as the modulation signals, and the periodic signals for spreading are used which halve their periods as the layer rises by one step, so that the topmost basic modulator element outputs a signal that is a sum total of $2^N$ spread modulation signals.

The above and other objects, effects, features and advantages of the present invention will become more apparent from the following description of the embodiments thereof taken in conjunction with the accompanying drawings.

BRIEF DESCRIPTION OF THE DRAWINGS

FIG. 2 is a diagram illustrating a generation rule of spreading sequences in accordance with the present invention;

FIG. 12 is a diagram illustrating another generation rule of spreading sequences in accordance with the present invention.

DETAILED DESCRIPTION OF PREFERRED EMBODIMENTS

The invention will now be described with reference to the accompanying drawings.

EMBODIMENT 1

Figure 1:
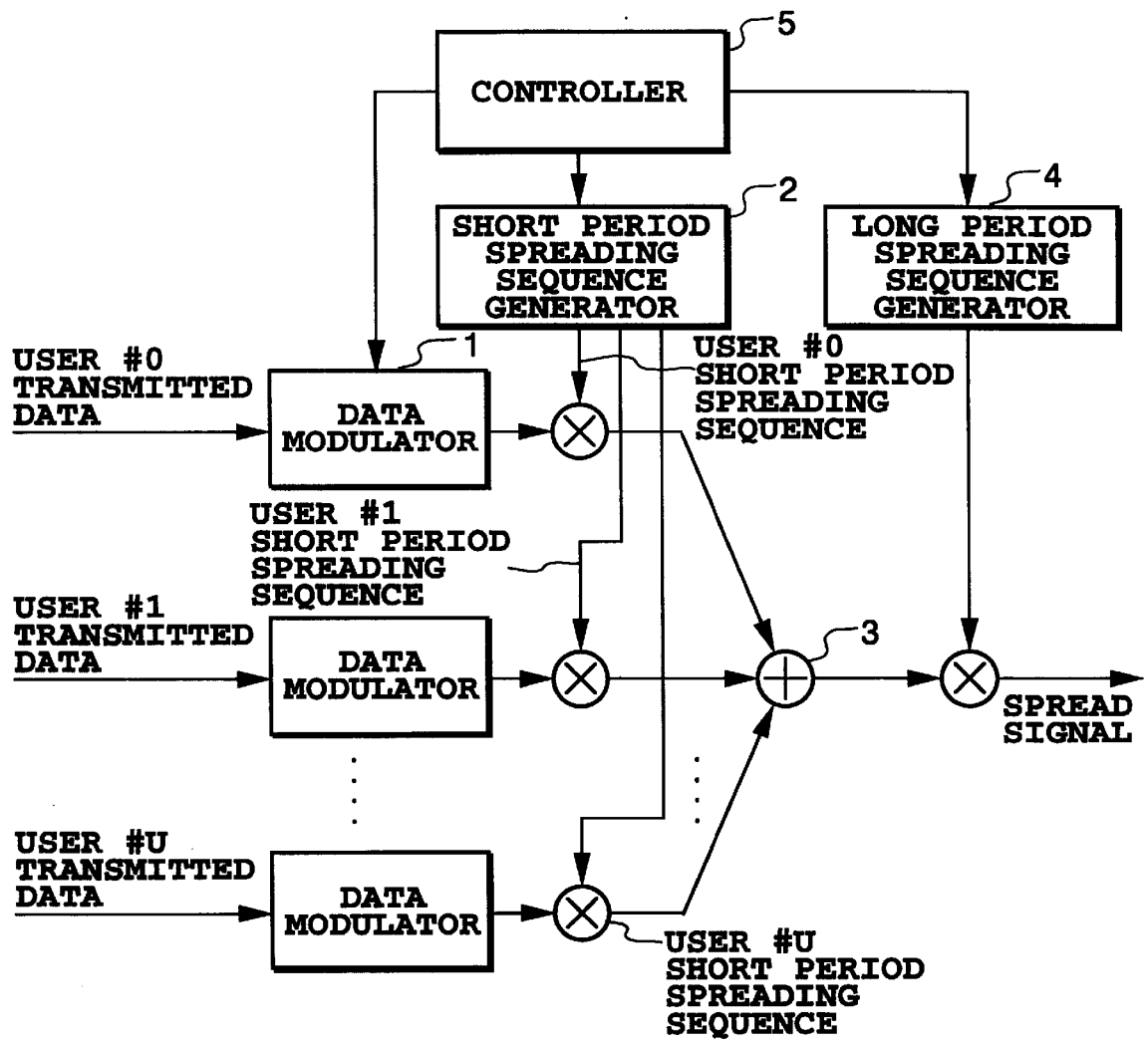
FIG. 1 is a block diagram showing a transmitting end of a CDMA transmission system in accordance with the present invention.
Figure 3:
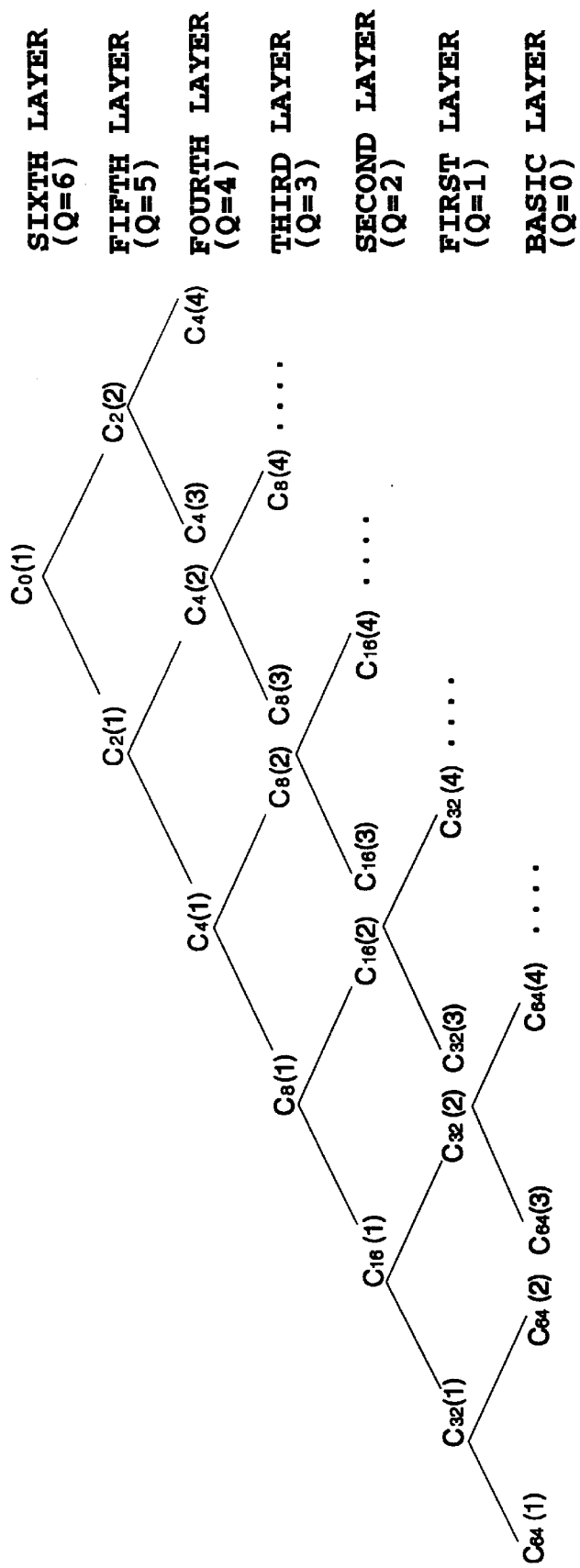
FIG. 3 is a diagram illustrating a hierarchical structure of the spreading sequences.

FIG. 1 is a block diagram showing a transmitting end, and FIGS. 2 and 3 are schematic diagrams illustrating a generation and assignment rule of spreading sequences in accordance with the present invention. As shown in FIG. 1, transmitted data of users are each modulated by data modulators 1 into narrowband modulated signals. The narrowband modulated signals each undergo spreading modulation into wideband signals using short period spreading sequences selected by a short period spreading sequence generator 2 in a manner as will be described later, followed by addition by an adder 3, and followed by spreading using a long period spreading sequence, thereby being output as a wideband spread signal. Here, the long period spreading sequence, having a period longer than that of the short period spreading sequences, is generated by a long period spreading sequence generator 4. A controller 5 controls the data modulators 1, short period spreading sequence generator 2 and long period spreading sequence generator 4.

The spreading sequences are generated under a predetermined rule as illustrated in FIG. 2. In FIG. 2, the matrix $C_2$ consists of $C_2(1)=(1,1)$ and $C_2(2)=(1,0)$. In FIG. 2, $\overline{C}_2(1)$ and $\overline{C}_2(2)$ denote $\overline{C}_2(1)=(0,0)$ and $\overline{C}_2(2)=(0,1)$, in which 1 and 0 are exchanged as those of $C_2(1)$ and $C_2(2)$. In this way, $C_{2n}$'s are defined as shown in FIG. 2. The row vectors of the matrices generated in this example become Walsh functions.

They are described in FIG. 3 in the form of a multilayer structure. Suffixes attached to symbols C represent the dimension of the matrices. An example is shown in which the maximum dimension is 64. This indicates that the period of the short period spreading sequence is 64 chips. At the peak transmission rate at the lowest layer, one of the 64 row vectors $\{C_{64}(1), \ldots, C_{64}(64)\}$ is assigned as a spreading sequence. Let us assume that the peak transmission rate of the lowest layer is 9.6 kbps. Then, at its double rate, one of the 32 row vectors $\{C_{32}(1), \ldots, C_{32}(32)\}$ is selected. If the peak rate is at $2^Q$ of that, one of the $2^{(6-Q)}$ row vectors $\{C_2^{6-Q}(1), \ldots, C_2^{6-Q}(2^{6-Q})\}$ is assigned as a spreading sequence. The values Q corresponding to the individual layers are represented at the far right of FIG. 3.

For example, assume that Q=2 and $C_{16}(1)$ sequence is used. The row vectors (called sequences from now on) $\{C_{32}(1), C_{32}(2)\}$ and $\{C_{64}(1) \, C_{64}(2), C_{64}(3), C_{64}(4)\}$, which are lower in rank than $C_{16}(1)$ sequence, contain $C_{16}(1)$ sequence or its inverted sequence $\overline{C}_{16}(1)$, where the mark "-" denotes inversion. Thus, if the sequences $\{C_{32}(1), C_{32}(2)\}$ or $\{C_{64}(1), C_{64}(2), C_{64}(3), C_{64}(4)\}$ which are lower in rank than $C_{16}(1)$ sequence are already being used, the $C_{16}(1)$ cannot be assigned as the spreading sequence for transmission with a peak rate of $2^2$ times the lowest transmission rate. In other words, the spreading sequence is selected and is used for different peak transmission rates in such a way that no sequences are used that are generated from the sequence to be selected and are lower in rank and correspond to. Thus, the spreading sequences of the entire simultaneous users can be made orthogonal at all transmission rate, as can be seen from the generation rule of the spreading sequences.

Figure 4:
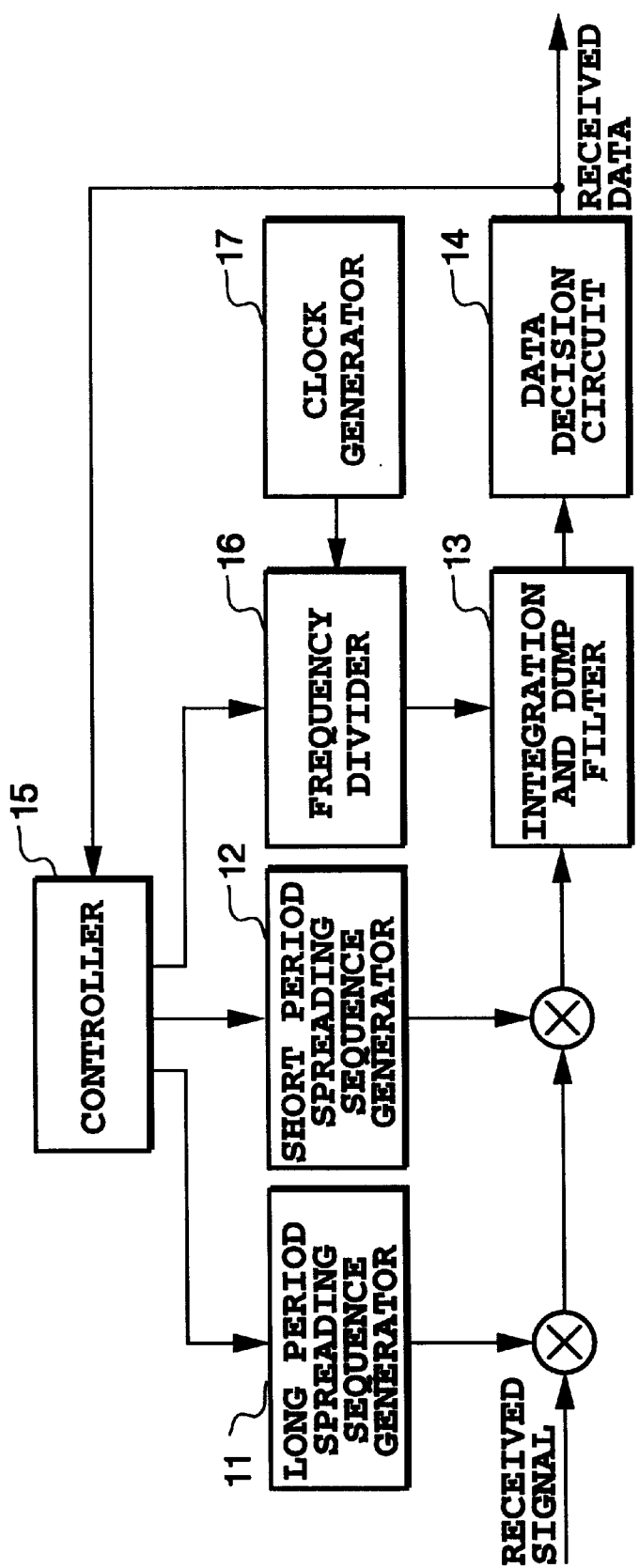
FIG. 4 is a block diagram showing a receiving end of the CDMA transmission system in accordance with the present invention.

FIG. 4 is a block diagram showing a receiving end. A received signal is despread using a long period spreading sequence selected by a long period spreading sequence generator 11, is further despread using a short period spreading sequence selected by a short period spreading sequence generator 12, passes through an integration and dump filter 13, and undergoes data decision by a data decision circuit 14 to be output as received data. A controller 15 supplies the long period spreading sequence generator 11 and short period spreading sequence generator 12 with data required for selecting the spreading sequences, provides a frequency divider 16 with the output of a clock generator 17, and supplies the integration and dump filter 13 with the integration and dump timing.

A despreading method at the receiving end will now be described in the case where the spreading sequence for the data transmission rate with a peak of $2^Q$ times the lowest peak rate is selected from among the $2^Q$ row vectors in the maximum dimensional $2^N \times 2^N$ matrix, which are generated from one of the row vectors in the $2^{N-Q} \times 2^{N-Q}$ matrix.

More specifically, the despreading method at the receiving end will be explained taking an example in which the peak data transmission rate is $2^Q=4$ times (Q=2) the lowest peak rate. In this case, the transmitting end does not use $C_{16}(1)$ but selects $C_{64}(2)$, for example, from among the sequences $\{C_{64}(1), C_{64}(2), C_{64}(3), C_{64}(4)\}$ in the maximum dimensional matrix, which include the sequence $C_{16}(1)$ as their sub-sequence. Accordingly, although the period of the sequence is 64 chips, the number of chips per bit of the transmitted data is 16. In this case, none of the $\{C_{64}(1), C_{64}(3), C_{64}(4)\}$ can be used for other users. The receiving end despreads using the spreading sequence $C_{64}(2)$, and decides the received data every 16 chip interval. The transmitted data will be decided correctly because the sequence C64(2) consists of the sequence $C_{16}(1)$ and its inverted sequence $\overline{C}_{16}(1)$, which are arranged in regular orders at every 16 chip interval. This makes it possible to handle the spreading sequences at any desired transmission rates as though they were the spreading sequences for the lowest transmission rate. In selecting the spreading sequence, however, it is inhibited for other users to employ any of the lowest layer spreading sequences $\{C_{64}\}$'s which belong to the sequence (that is, $C_{16}(1)$ in this case) reached by tracing back the code tree structure of FIG. 3 from $C_{64}(2)$ up to the second layer (Q=2).

Figure 5:
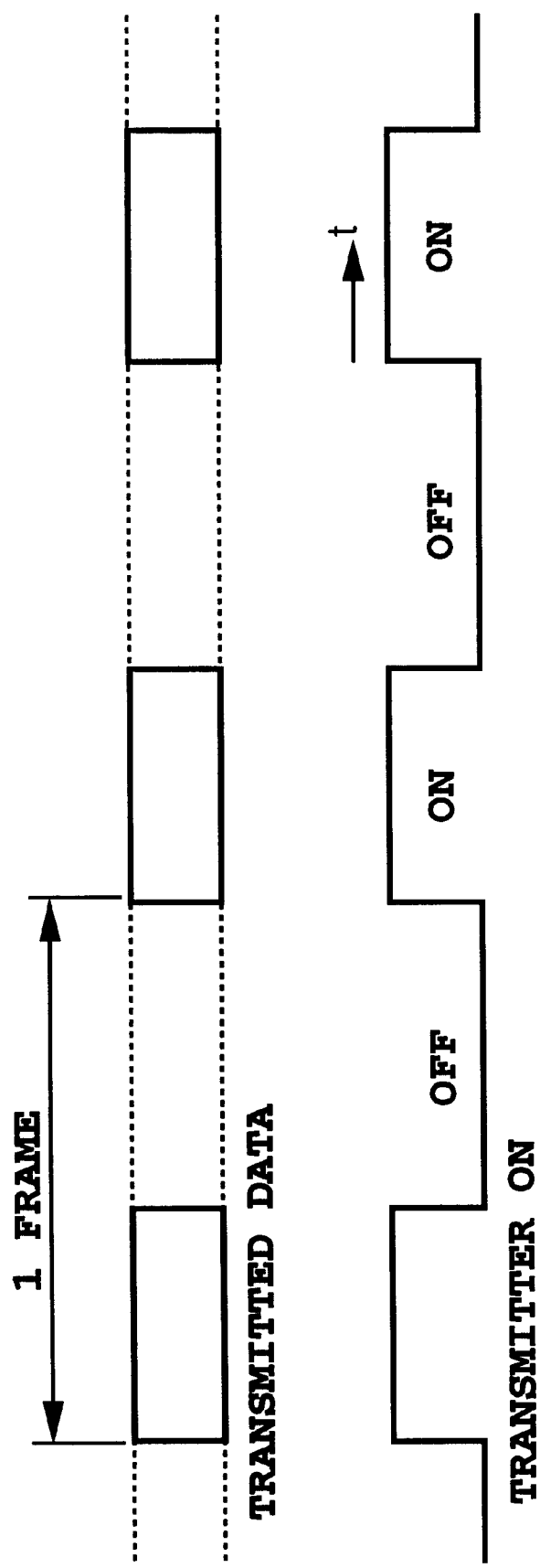
FIG. 5 is a diagram illustrating a radio transmission data sequence of a base station and a mobile station.

Next, a method will be described for generating vacancies in the transmission time in accordance with the transmission rate when the data transmission rate falls below $2^Q$ times the lowest peak rate during the CDMA communications. As an example of this, FIG. 5 illustrates a radio transmitted data sequence of a base station and a mobile station. The transmitted data is divided at every fixed interval (one frame time), is converted into frame data with a rate of R bit/sec corresponding to the peak of the data transmission rate regardless of the current data transmission rate, and is multiplied by the spreading sequence (that is, being spread). Here, R equals $2^Q$ times the lowest peak rate, where Q is any integer equal to or less than N. Accordingly, when the current transmission rate is R×C, where C is equal to or less than one, the number of the transmitted data in the frame becomes C times that at the peak rate. Thus, C is referred to as a transmission time ratio. Adjusting the transmission time ratio in this way makes it possible for the radio transmission rate to be kept constant (at the peak rate R) even if the data transmission rate changes during the communication.

A method for assigning spreading sequence in the case where Q=2 will now be described referring to FIG. 3. Considering that the peak of the data transmission rate is $2^Q=4$ times the lowest peak, let us assume that the spreading sequence $C_{16}(1)$ is assigned. When the data transmission rate changes in the course of the communications, the transmitted data is decided at every 16 chips at the receiving end without changing the spreading sequence. Thus, once the peak of the data transmission rate has been determined, the same spreading sequence is continually used in spite of the change of the data transmission rate during the communications, in which case it may occur that the transmission time ratio approaches zero.

In view of this, when the data transmission rate falls, reassignment of a lower layer spreading sequence is possible in response to that. If the data transmission rate falls in the range from $2^{P-1}$ to $2^P$ times the lowest peak rate, where P is any integer equal to or less than Q, the transmission time ratio C is at least 50%. A method for assigning the spreading sequence when Q=2 will be described. Let us assume that the sequence $C_{16}(1)$ as shown in FIG. 3 is initially assigned. When the transmission rate falls below ½ of the peak during the communications, one of the spreading sequences $\{C_{32}(1), C_{32}(2)\}$ is reassigned which belongs to the layer following the $C_{16}(1)$ layer. If the transmission rate falls below ¼, one of the spreading sequences $\{C_{64}(1), C_{64}(2), C_{64}(3), C_{64}(4)\}$ is reassigned which belongs to the one more lower layer.

On the other hand, when assigning the spreading sequence, one of the spreading sequences $\{C_{64}(1), C_{64}(2), C_{64}(3), C_{64}(4)\}$ in the lowest layer is assigned from the beginning. In this case, even if the transmission rate changes during the communications, the spreading sequence is not changed unless it falls below ½ of the peak (corresponding to Q=2), thus to continue the transmission by adjusting the transmission time ratio, causing spaces in the transmission time. When despreading the received data using this sequence, the receiving end changes the decision period of the transmitted data in such a way that it decides the transmitted data at every 32 chip interval when the transmission rate falls below ½ of the peak, and every 64 chip interval when it falls below ¼ of the peak.

A configuration of a group spreading modulator will now be described which has one to one correspondence with the above-described spreading code generation method with a tree structure.

Figure 6:
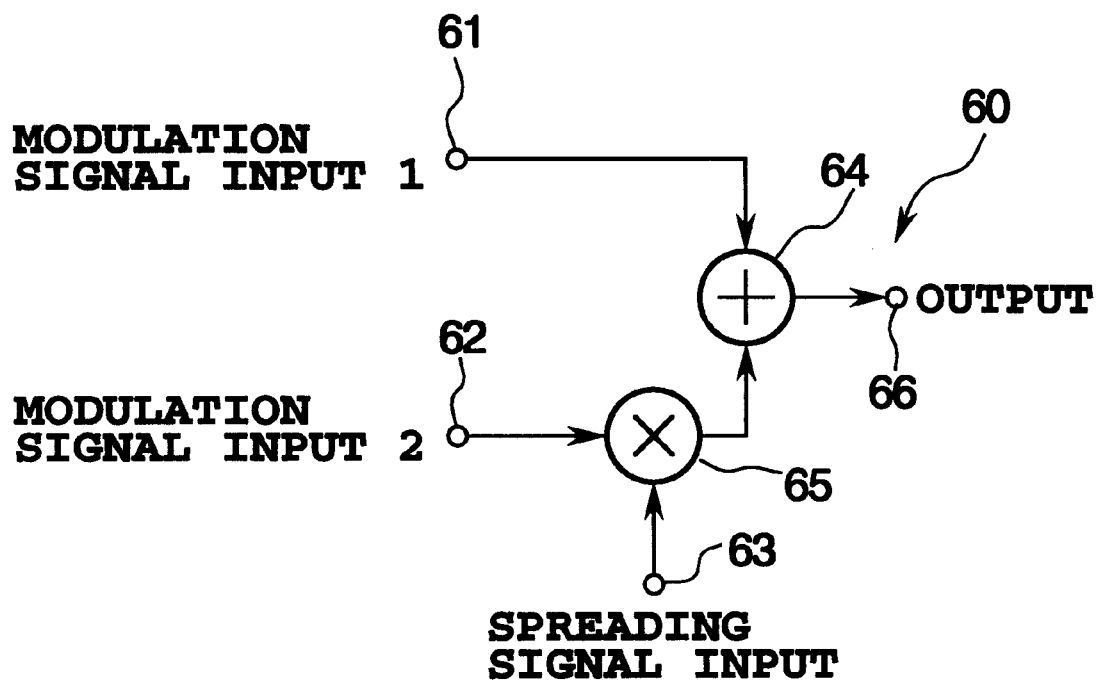
FIG. 6 is a circuit diagram showing a basic modulator element employed in the embodiments in accordance with the present invention.

FIG. 6 shows a basic modulator element with three inputs and a single output as the basic component of the group spreading modulator. In FIG. 6, the basic modulator element has its two input terminals 61 and 62 to which modulation signals are input, and its input terminal 63 to which a spreading signal is input, wherein one of the two modulation signals (that is, the signal fed to the terminal 62) is multiplied by the spreading signal by a multiplier 65. The modulation signal fed to the terminal 61 is added to the output of the multiplier 65 by an adder 64, and the resultant sum is output from an output terminal 66.

Figure 7:
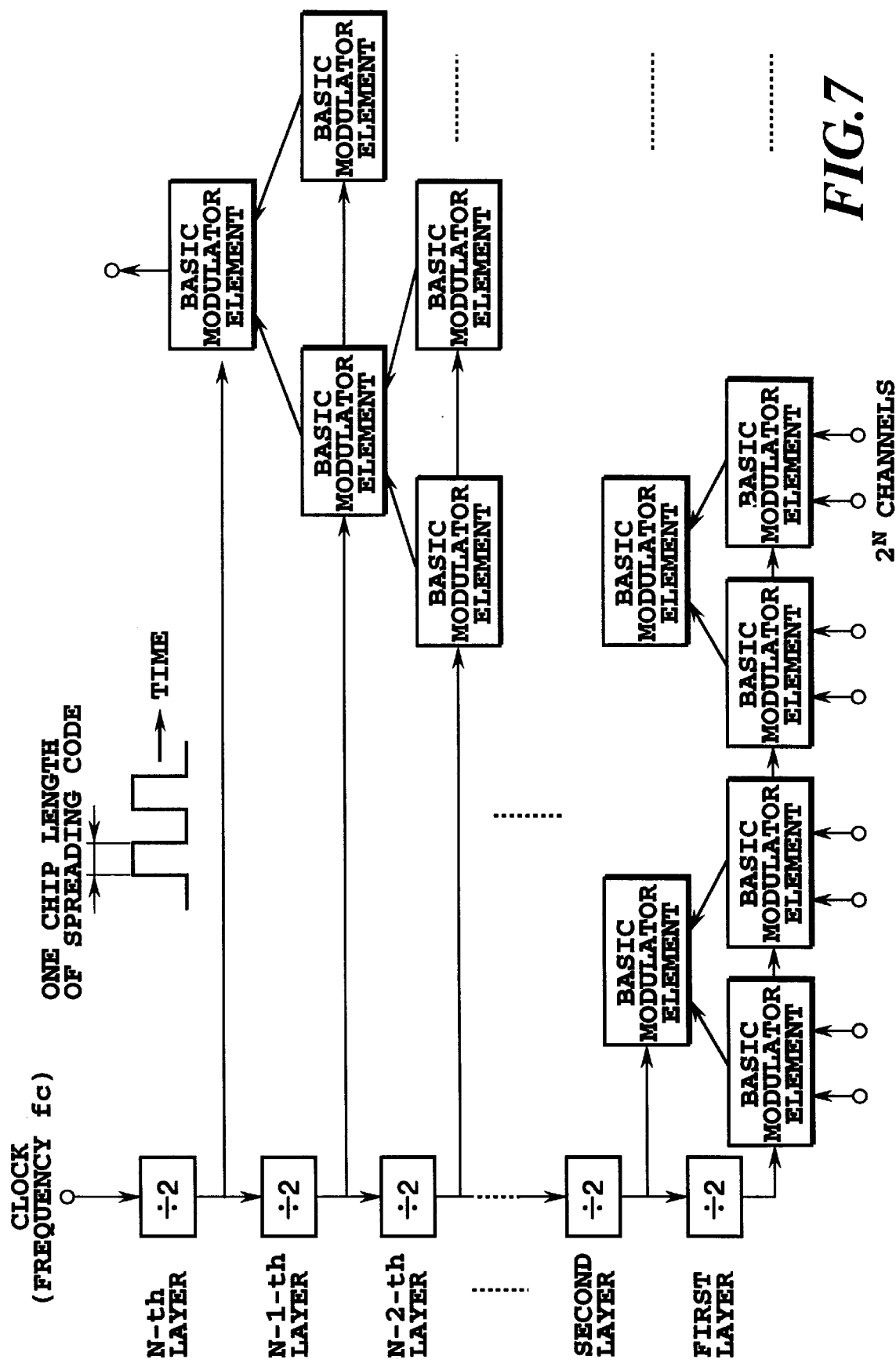
FIG. 7 is a block diagram showing an embodiment 1 of a group spreading modulator in accordance with the present invention, which spreads data of $2^N$ channels.

FIG. 7 shows the group spreading modulator composed of hierarchically connected, N-layer basic modulator elements 60 as shown in FIG. 6. In the arrangement of FIG. 7, the number of channels is the N-th power of two.

Figure 8:
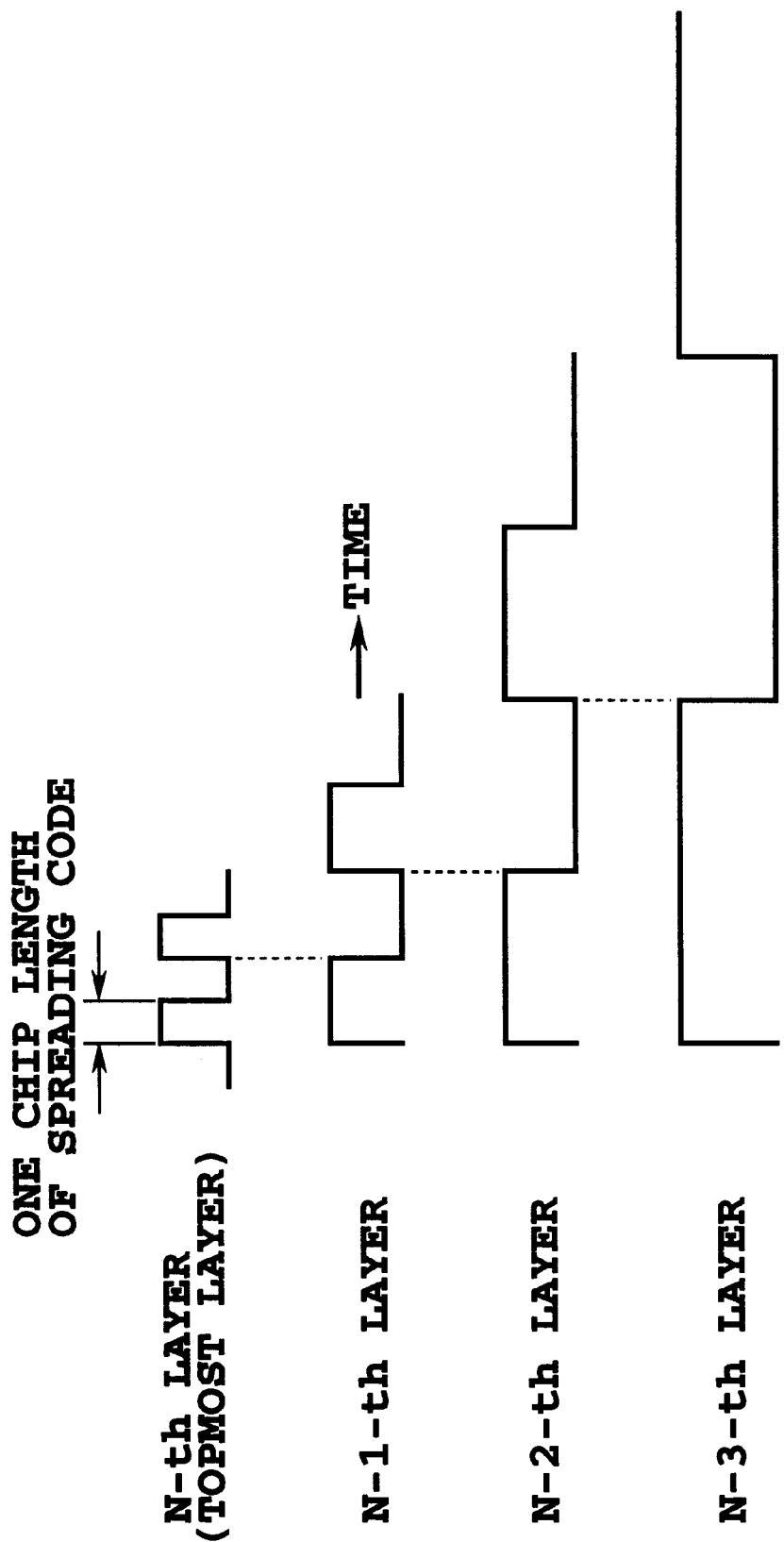
FIG. 8 is a waveform diagram showing spreading signals input to basic modulator elements of respective layers.

The primary layer of the group modulator as shown in FIG. 7 includes $2^{(N-1)}$ elements, and the number of the elements is halved as the layer rises each step. The spreading rectangular signals input to respective layers are a periodic square waveform signal, and their frequencies are doubled as the layer rises each step, such as the frequency of the primary layer is $½^N$ of the clock frequency fc, and that of the secondary layer is $fc/2^{(N-1)}$, where the clock frequency fc equals the chip rate. The frequency of the spreading signal input to the highest layer (N-th layer) is fc/2. FIG. 8 illustrates the relationships between the periodic rectangular signals of respective layers.

The configuration of FIG. 7 can achieve the modulation when the data rate of the entire channels are equal. In this case, the ratio of the rate of the spreading sequence (chip rate fc) to the modulation rate of the narrowband modulation signal (symbol rate) is $2^N$. For example, when the chip rate fc=4.096 Mcps and N=6, the symbol rate becomes 4.096 Mcps/64=64 k symbols/sec, and the number of channels is $2^N=64$ channels.

EMBODIMENT 2

Figure 9:
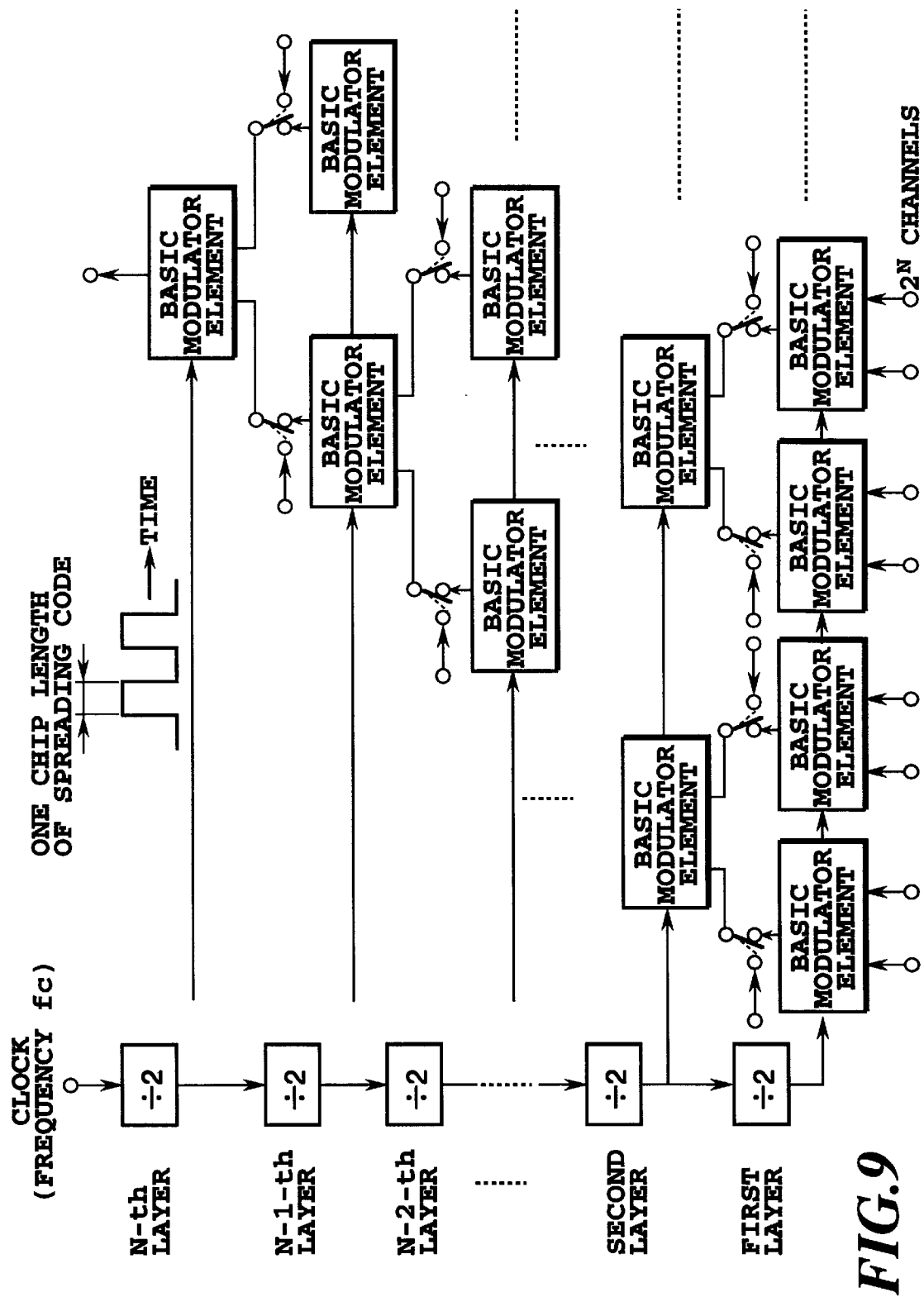
FIG. 9 is a block diagram showing an embodiment 2 of a group spreading modulator in accordance with the present invention, which spreads data of channels of different transmission rates.

FIG. 9 shows a configuration of a modulator that can implement multi-rate modulation using the spreading sequences of the tree structure as shown in FIG. 3.

The modulator as shown in FIG. 9 has, besides the configuration as shown in FIG. 7, a structure that enables the narrowband modulation signals to be input directly to the input terminals of upper layers. To achieve this, each of the two inputs of the basic modulator element is provided with a switch for switching the inputs. For example, a modulation signal of a channel of twice the symbol rate can be directly input to one of the two inputs of the element at the secondary layer, which includes that channel. Likewise, a modulation signal of a channel of four times the symbol rate can be directly input to one of the two input terminals of the element at the third layer, the one of the two input terminals including that channel, and a modulation signal of a channel of the $2^P$ times the symbol rate can be directly input to one of the two input terminals of the element at the (p+1)-th layer, the one of the two input terminals including that channel.

This modulation method has strict one-to-one correspondence with the generation rule of the spreading code sequences of the tree structure as shown in FIG. 3.

EMBODIMENT 3

Figure 10:
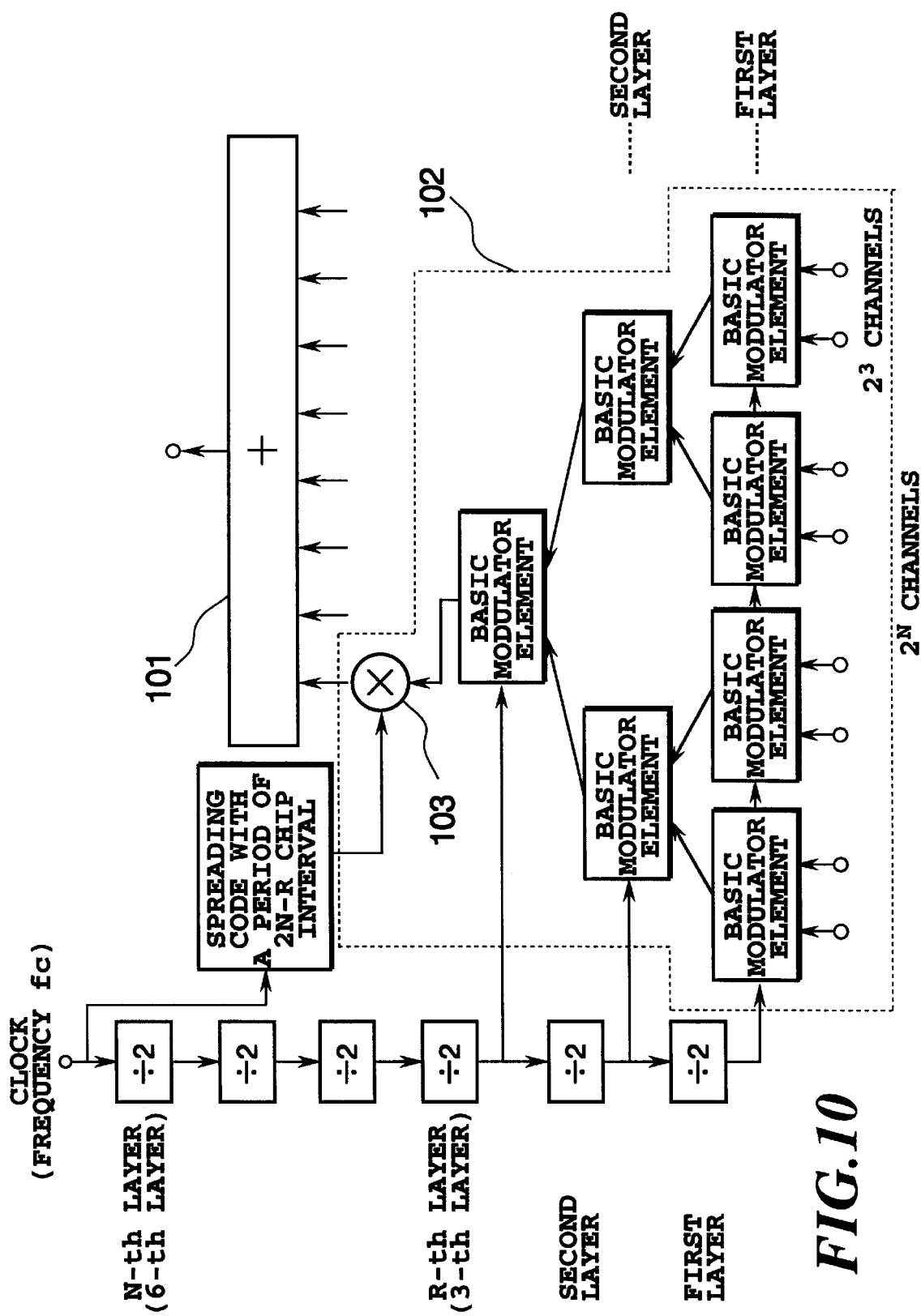
FIG. 10 is a block diagram showing an embodiment 3 of a group spreading modulator in accordance with the present invention, which spreads data of $2^N$ channels.

FIG. 10 shows a group modulator constructed using a smaller number of basic modulator elements than that of FIG. 7. In FIG. 10, the basic modulator elements are hierarchically connected in R layers, where R is less than N, and the output of the topmost element is multiplied by an orthogonal code sequence with a period of $2^{(N-R)}$ chip intervals, thus constituting a group modulator unit. At the final layer, the outputs of the $2^{(N-R)}$ group modulator units are summed up. The configuration as shown in FIG. 10 is a case where N=6 and R=3.

In the configuration as shown in FIG. 10, the elements are hierarchically connected in R layers (R<N) rather than connected in N layers as shown in FIG. 7, and the output of the topmost element is multiplied by an orthogonal spreading code sequence with the $2^{(N-R)}$ chip intervals by a multiplier 103. The total of $2^{(N-R)}$ thus constructed group modulator units 102 are used so that their outputs are summed up by the adder 101, thereby producing a spread signal obtained by the spread modulation of the $2^N$ channels.

With this arrangement connecting in parallel a plurality of the group modulator units 102 with a smaller number of channels makes it possible to expand to a group spreading modulator having a larger number of channels.

Furthermore, the configuration as shown in FIG. 10 can be altered to a modulator that can achieve the multi-rate modulation corresponding to the tree-structure as shown in FIG. 3. To achieve this, it is necessary to provide each of the multiple basic modulator elements in the upper layers with a switch to enable the narrowband signals to be input directly to their input terminals as shown in FIG. 9. This makes it possible to construct a modulator that can achieve the modulation using the spreading codes in the tree structure corresponding to the multi-rates.

EMBODIMENT 4

Figure 11:
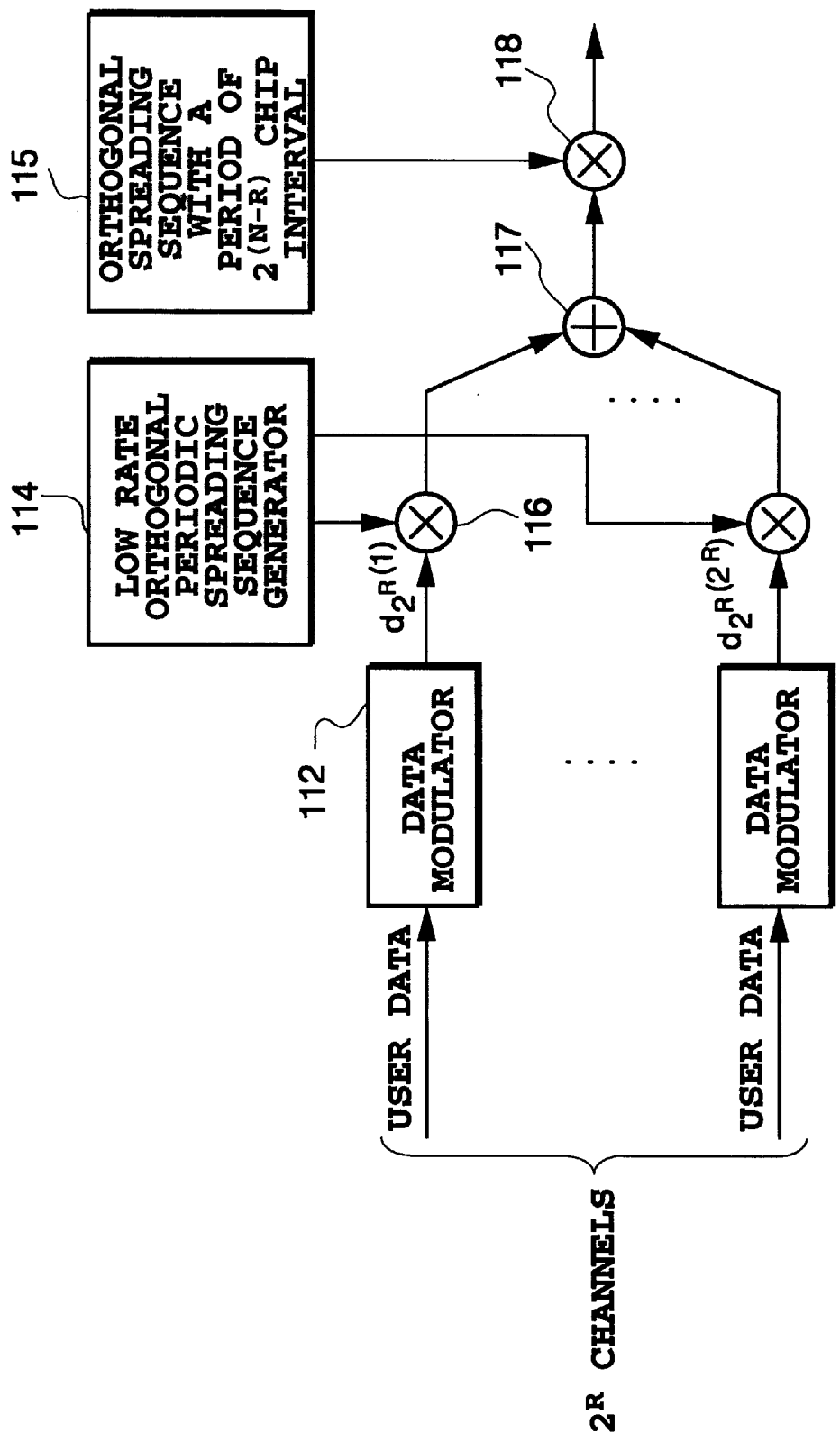
FIG. 11 is a block diagram showing another transmitting end of the CDMA transmission system in accordance with the present invention.

FIG. 11 shows another configuration of an $2^R$ channel group modulator corresponding to that enclosed by the broken lines in FIG. 10. In FIG. 11, the user data of $2^R$ channels are each input to data modulators 112 to obtain narrowband modulated signals. The $2^R$ data modulated signal outputs from the data modulators 112 are multiplied by spread sequences fed from a low rate orthogonal periodic spreading sequence generator 114 by multipliers 116, and combined by an adder 117. Subsequently, the output of the adder 117 is multiplied by a orthogonal spreading code sequence with a period of an $2^{(N-R)}$ chip interval as in FIG. 10. The spreading sequences to be multiplied by the modulated signal outputs will now be described below.

The spread modulation as shown in FIG. 11 carries out multiplication by the orthogonal codes through two steps. First, the spreading codes generated by the low rate orthogonal periodic spreading sequence generator 114 are multiplied which constitute Walsh functions with a rate of a $\frac{1}{2}^{(N-R)}$ of the spread chip rate.

The spreading sequences generated by the low rate orthogonal periodic spreading sequence generator 114 will be described with reference to FIGS. 12 and 13.

In FIG. 12, a matrix $D_1=1$, and two adjacent matrices have relationships as shown in this figure. The low rate orthogonal periodic spreading sequences are generated from the row vectors of the matrix related by equations in FIG. 12.

Figure 13:
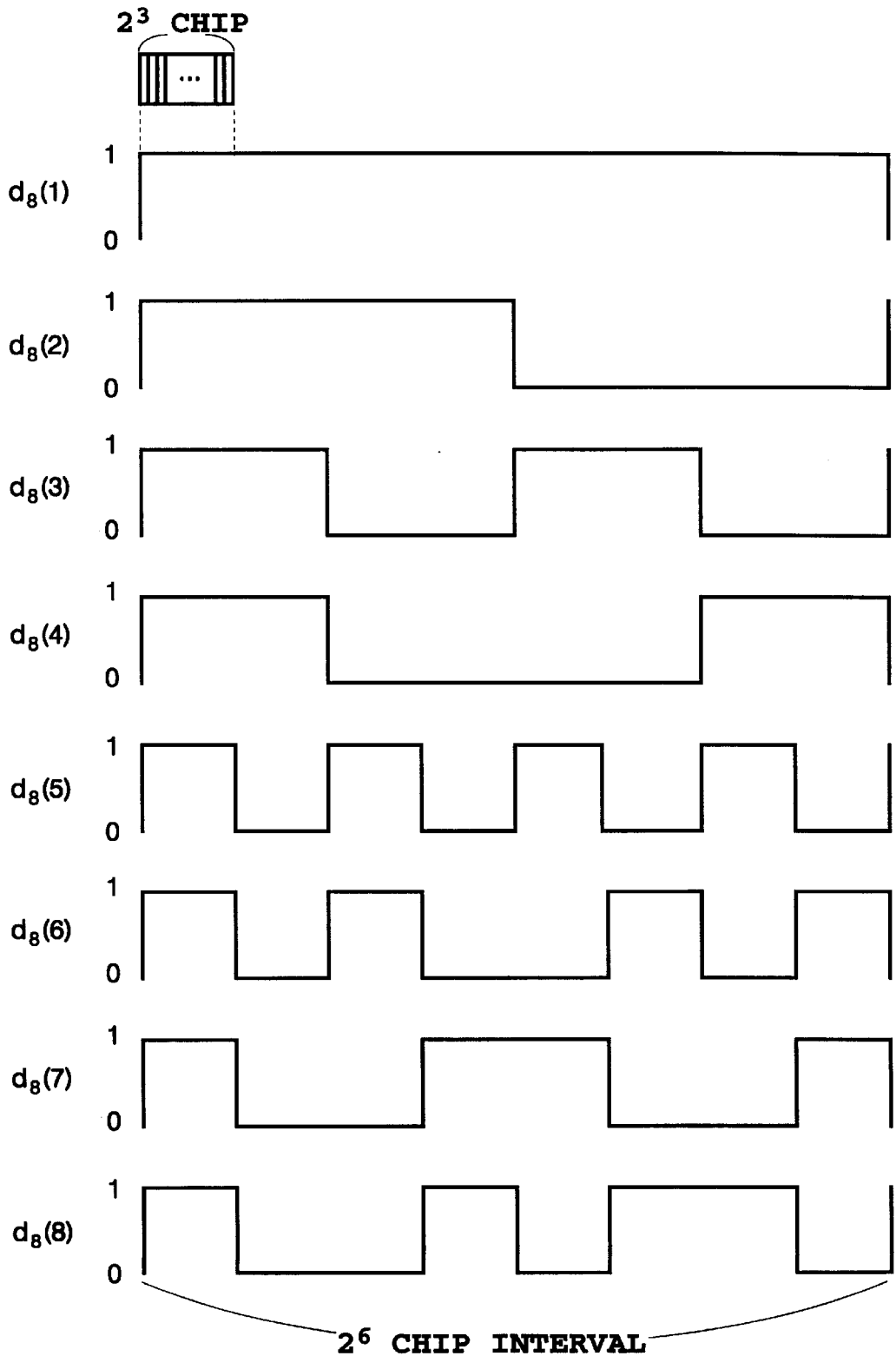
FIG. 13 is a diagram showing time relationships between low rate spreading code sequences.

FIG. 13 shows an example of time relations between the row vectors and the spreading sequences, in which N=6 and R=3. As seen from this figure, the low rate orthogonal periodic spreading sequences are well-known Walsh functions.

Second, the orthogonal spreading code sequence with a period of the $2^{(N-R)}$ chip interval generated by the generator 115 is multiplied. It is obtained by successively generating a greater dimensional matrix from lower dimensional matrix as described above in connection with FIGS. 2 and 3, and by selecting one of the row vectors in the matrix. Or one of the components of a set of orthogonal sequences can be used (for example, orthogonal Gold sequences). Thus, the spreading sequences for the spreading modulation can be obtained.

It is obvious that the spreading sequences obtained by means of the low rate orthogonal periodic signal generation have a hierarchical structure as shown in FIG. 3. It is also true that if a corresponding spreading code sequence in a lower layer in this hierarchical structure has already been assigned to a user, the spreading sequence of the layer that generates the corresponding spreading code sequence cannot be used.

In addition, it is also possible for the low rate orthogonal periodic signal generation to carry out control in such a manner that vacancies are generated in the transmission time without changing the spreading sequence as described above in connection with FIG. 5, even if the lowest peak rate of the data transmission varies.

Furthermore, it is also possible for the low rate orthogonal periodic signal generation to perform control such that the spreading sequence is reassigned when the data transmission rate reduces by 50% or more.

The spread modulation as described above in connection with FIGS. 11–13 can be achieved using the group modulators as described in connection with FIGS. 6–10.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A CDMA communication method which obtains a narrowband modulated signal by modulating transmitted data, performs spreading modulation of the narrowband modulated signal into a wideband signal using a spreading sequence, and transmits the wideband signal, said CDMA communication method comprising the steps of:

successively generating a $2^N \times 2^N$ matrix, where N is an integer greater than zero, from a smaller dimensional matrix under a predetermined rule, row vectors of said $2^N \times 2^N$ matrix being orthogonal to each other; and selecting one of said row vectors of one of said matrix as the spreading sequence in accordance with a peak rate of a transmission rate of said transmitted data.

2. The CDMA communication method as claimed in claim 1, wherein said step of selecting comprising the sub-steps of:

dividing peaks of transmission rates of the transmitted data into a plurality of ranks;

choosing, when transmitting data at a lowest peak rate, one of row vectors in a maximum dimensional $2^N \times 2^N$ matrix, where N is an integer greater than one, said row vectors having a period of $2^N$ chip interval; and selecting, when transmitting data at a peak rate of $2^Q$ times the lowest peak rate, one of row vectors in an $2^{N-Q} \times 2^{N-Q}$ matrix, where Q is an integer equal to or less than N, said row vectors having a period of $2^{N-Q}$ chip interval.

3. The CDMA communication method as claimed in claim 2, wherein the sub-step of selecting carries out selecting, when selecting a row vector in a $2^k \times 2^k$ matrix as the spreading sequence, where k is an integer smaller than N, such that the row vector is not selected if the row vector or its inverted vector is included as a sub-vector in any one of row vectors in a $2^j \times 2^j$ matrix, where j is an integer greater than k, and if said $2^j \times 2^j$ matrix includes at least one row vector which has already been assigned as the spreading sequence.

4. The CDMA communication method as claimed in claim 1, wherein said step of selecting selects, when the peak data transmission rate is 2Q times the lowest peak rate, one of 2Q row vectors in a maximum dimensional $2^N \times 2^N$ matrix as the spreading sequence, said 2Q row vectors being generated from one of row vectors in a $2^{N-Q} \times 2^{N-Q}$ matrix, where Q is an integer equal to or less than N.

5. The CDMA communication method as claimed in claim 2, further comprising the step of generating vacancies in a transmission time in accordance with the transmission rate if the data transmission rate falls below $2^Q$ times the lowest peak rate during communications.

6. The CDMA communication method as claimed in claim 2, further comprising the step of reassigning the newly selected spreading sequence if the data transmission rate falls in a range from $2^{P-1}$ to $2^P$ times the lowest peak rate during communications, where P is an integer equal to or less than Q.

7. The CDMA communication method as claimed in claim 2, further comprising the step of generating vacancies in a transmission time in accordance with the transmission rate if the data transmission rate is in a range from $2^{P-1}$ to $2^P$ times the lowest peak rate, where P is an integer equal to or less than Q.

8. The CDMA communication method as claimed in claim 4, further comprising the step of generating vacancies in a transmission time in accordance with the transmission rate if the data transmission rate falls below $2^Q$ times the lowest peak rate during communications.

9. The CDMA communication method as claimed in claim 4, further comprising the step of reassigning the newly selected spreading sequence if the data transmission rate falls in a range from $2^{P-1}$ to $2^P$ times the lowest peak rate during communications, where P is an integer equal to or less than Q.

10. The CDMA communication method as claimed in claim 4, further comprising the step of generating vacancies in a transmission time in accordance with the transmission rate if the data transmission rate is in a range from $2^{P-1}$ to $2^P$ times the lowest peak rate, where P is an integer equal to or less than Q.

11. The CDMA communication method as claimed in claim 1, wherein a spread signal is further multiplied by a spreading sequence with a period longer than that of the spreading sequence used for generating said spread signal.

12. The CDMA communication method as claimed in claim 1, wherein said step of selecting selects, when the peak data transmission rate is $2^Q$ times the lowest peak rate, one of $2^Q$ row vectors in a maximum dimensional $2^N \times 2^N$ matrix as the spreading sequence, said $2^Q$ row vectors being generated from one of row vectors in the $2^{N-Q} \times 2^{N-Q}$ matrix, and further comprising at a receiving end the steps of:

receiving the transmitted signal which has been spread using the selected spreading sequence;

despreading the received transmitted signal; and deciding the transmitted data from the despread signal for every $2^{N-Q}$ chip interval or $2^{R-Q}$ chip interval.

13. A receiver comprising a despreader and demodulator for recovering the transmitted data using the CDMA communication method as claimed in claim 12.

14. A transmitter comprising a modulator for generating a spread transmitted signal using the CDMA method as claimed in claim 1.

15. A CDMA communication method which obtains narrowband modulated signals by modulating transmitted data, performs spreading modulation of the narrowband modulated signals into a wideband signal using spreading sequences, and transmits the wideband signal, said CDMA communication method comprising the steps of:

successively generating a $2^{N-R} \times 2^{N-R}$ matrix, where N and R are integers greater than zero, and R is smaller than N, from a smaller dimensional matrix under a predetermined rule, row vectors of said $2^{N-R} \times 2^{N-R}$ matrix being orthogonal to each other;

selecting one of said row vectors of said matrix as a common first spreading sequence, or selecting as the common first spreading sequence one of a set of orthogonal sequences generated using another generating method;

successively generating a $2^R \times 2^R$ matrix from a smaller dimensional matrix under a predetermined rule, row vectors of said $2^R \times 2^R$ matrix being orthogonal to each other;

selecting each row vector in said $2^R \times 2^R$ matrix as a second spreading sequence whose rate is $\frac{1}{2}^{N-R}$ of that of said common first spreading sequence; and carrying out spreading modulation by multiplying narrowband modulated signals by said common first spreading sequence and each said second spreading sequence.

16. The CDMA communication method as claimed in claim 15, wherein said step of selecting said second spreading sequence comprising the sub-steps of:

dividing peaks of transmission rates of the transmitted data into a plurality of ranks;

choosing, when transmitting data at a lowest peak rate, one of row vectors in a maximum dimensional $2^R \times 2^R$ matrix, where R is an integer greater than one, said row vectors; and selecting, when transmitting data at a peak rate of $2^Q$ times the lowest peak rate, one of row vectors in an $2^{R-Q} \times 2^{R-Q}$ matrix as the second spreading sequence, where Q is an integer equal to or less than R.

17. The CDMA communication method as claimed in claim 16, wherein the sub-step of selecting the second spreading sequence carries out selecting, when selecting a row vector in a $2^k \times 2^k$ matrix as the spreading sequence, where k is an integer smaller than R, such that a row vector is not selected if the row vector or its inverted vector is included as a sub-vector in any one of row vectors in a $2^j \times 2^j$ matrix, where j is an integer greater than k, and if said $2^j \times 2^j$ matrix includes at least one row vector which has already been assigned as the second spreading sequence.

18. The CDMA communication method as claimed in claim 15, wherein said step of selecting the second spreading sequence selects, when the peak data transmission rate is $2^Q$ times the lowest peak rate, where Q is an integer equal to or less than R, one of $2^Q$ row vectors in a maximum dimensional $2^R \times 2^R$ matrix as the spreading sequence, said $2^Q$ row vectors being generated from one of row vectors in the $2^{R-Q} \times 2^{R-Q}$ matrix.

19. The CDMA communication method as claimed in claim 16, further comprising the step of generating vacancies in a transmission time in accordance with the transmission rate if the data transmission rate falls below $2^Q$ times the lowest peak rate during communications.

20. The CDMA communication method as claimed in claim 16, further comprising the step of reassigning the newly selected second spreading sequence if the data transmission rate falls in a range from $2^{P-1}$ to $2^P$ times the lowest peak rate during communications, where P is an integer equal to or less than Q.

21. The CDMA communication method as claimed in claim 16, further comprising the step of generating vacancies in a transmission time in accordance with the transmission rate if the data transmission rate is in a range from $2^{P-1}$ to $2^P$ times the lowest peak rate, where P is an integer equal to or less than Q.

22. The CDMA communication method as claimed in claim 18, further comprising the step of generating vacancies in a transmission time in accordance with the transmission rate if the data transmission rate falls below $2^Q$ times the lowest peak rate during communications.

23. The CDMA communication method as claimed in claim 18, further comprising the step of reassigning the newly selected second spreading sequence if the data transmission rate falls in a range from $2^{P-1}$ to $2^P$ times the lowest peak rate during communications, where P is an integer equal to or less than Q.

24. The CDMA communication method as claimed in claim 18, further comprising the step of generating vacancies in a transmission time in accordance with the transmission rate if the data transmission rate is in a range from $2^{P-1}$ to $2^P$ times the lowest peak rate, where P is an integer equal to or less than Q.

25. The CDMA communication method as claimed in claim 15, wherein a spread signal is further multiplied by a spreading sequence with a period longer than that of the spreading sequence used for generating said spread signal.

26. The CDMA communication method as claimed in claim 15, wherein said step of selecting the second spreading sequence selects, when the peak data transmission rate is $2^Q$ times the lowest peak rate, where Q is an integer equal to or less than R, one of $2^Q$ row vectors in a maximum dimensional $2^R \times 2^R$ matrix as the spreading sequence, said $2^Q$ row vectors being generated from one of row vectors in the $2^{R-Q} \times 2^{R-Q}$ matrix, and further comprising at a receiving end the steps of:

receiving the transmitted signal which has been spread using the selected spreading sequence;

despreading the received transmitted signal; and deciding the transmitted data from the despread signal for every $2^{N-Q}$ chip interval or $2^{R-Q}$ chip interval.

27. A receiver comprising a despreader and demodulator for recovering the transmitted data using the CDMA communication method as claimed in claim 26.

28. A group spreading modulator for spreading a plurality of narrowband signals into a wideband signal, said group spreading modulator comprising:

multiple basic modulator elements arranged in an N-layer hierarchical structure, where N is an integer greater than one, each of said multiple basic modulator elements having three inputs and a single output, two inputs of the three inputs being supplied with modulation signals, and a remaining input being supplied with a periodic signal for spreading which is multiplied by one of the two modulation signals, wherein the number of said multiple basic modulator elements being halved as the layer rises by one step in the N-layer hierarchical structure such that $2^{(N-1)}$ basic modulator elements are placed at a primary layer, $2^{(N-2)}$ basic modulator elements are placed at a secondary layer, $2^{(N-3)}$ basic modulator elements are places at a third layer, and wherein outputs of the multiple basic modulator elements at a layer are input to the multiple basic modulator elements at an immediately upper layer as the modulation signals, and the periodic signals for spreading are used which halve their periods as the layer rises by one step, so that the topmost basic modulator element outputs a signal that is a sum total of $2^N$ spread modulation signals.

29. The group spreading modulator as claimed in claim 28, wherein said multiple basic modulator elements at a higher layer include an input terminal for directly accepting the narrowband modulated signals.

30. The group spreading modulator as claimed in claim 28, wherein said multiple basic modulator elements are arranged in a plurality of R-layer hierarchical structures instead of the N-layer hierarchical structure, where R is an integer less than N, and wherein said group spreading modulator comprising:

$2^{(N-R)}$ group modulator units, each of which includes a multiplier for multiplying an output of a topmost basic modulator element of each of the R-layer hierarchical structures by an orthogonal code sequence with a period of $2^{(N-R)}$ chip interval; and an adder for summing up outputs of said $2^{(N-R)}$ group modulator units.

* * * * *